United States Patent
Sundaram (10) Patent No.: US 12,333,497 B2
(45) Date of Patent: **\*Jun. 17, 2025**

(54) SEARCHABLE INDEX ENCRYPTION

(71) Applicant: Capital One Services, LLC, McLean, VA (US)

(72) Inventor: Dinesh Sundaram, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,626

(22) Filed: May 23, 2024

(65) Prior Publication Data

US 2024/0411924 A1    Dec. 12, 2024

Related U.S. Application Data (63) Continuation of application No. 18/141,637, filed on May 1, 2023, now Pat. No. 12,001,586, which is a
(Continued)

(51) Int. Cl.
    G06F 21/60    (2013.01)
    G06F 9/445    (2018.01)
    (Continued)

(52) U.S. Cl.
    CPC ......... *G06Q 10/10* (2013.01); *G06F 9/44505* (2013.01); *G06F 9/54* (2013.01);
    (Continued)

(58) Field of Classification Search
    CPC ................. G06F 21/602; G06F 21/6227
    See application file for complete search history.

(56) References Cited

U.S. PATENT DOCUMENTS

| 6,029,149 A | 2/2000 | Dykstra et al. |
| 6,208,979 B1 | 3/2001 | Sinclair |

(Continued)

FOREIGN PATENT DOCUMENTS

| EP | 3723341 A1 | 10/2020 |
| WO | 2015136503 A1 | 9/2015 |

OTHER PUBLICATIONS

NPL Search (Google Scholar) (Year: 2020).
(Continued)

*Primary Examiner* — Izunna Okeke
(74) *Attorney, Agent, or Firm* — Sterne, Kessler, Goldstein & Fox P.L.L.C.

(57) ABSTRACT

Auditing data containing sensitive data are stored in a data structure comprising data objects. Each data object comprises one or more pairs of a name and a value. Pairs that are flagged or identified as containing sensitive data are partially encrypted; the value is encrypted using an asymmetric key and the name corresponding to the encrypted value remains unencrypted. Some pairs that are not flagged or identified as containing sensitive data are left unencrypted. Unencrypted data may be stored in the partially encrypted auditing data as plain text. The auditing data may be analyzed to generate business metrics and identify application errors. The auditing data may also be queried, and data objects containing unencrypted pairs and/or partially encrypted pairs may be returned based on matching unencrypted names and/or values to the data query.

14 Claims, 6 Drawing Sheets

Related U.S. Application Data continuation of application No. 16/881,938, filed on May 22, 2020, now Pat. No. 11,676,102.

(60) Provisional application No. 62/852,202, filed on May 23, 2019.

(51) Int. Cl.

| | | |
|---|---|---|
| G06F 9/54 | (2006.01) | |
| G06F 16/25 | (2019.01) | |
| G06F 16/955 | (2019.01) | |
| G06F 18/24 | (2023.01) | |
| G06F 21/53 | (2013.01) | |
| G06F 21/62 | (2013.01) | |
| G06F 40/103 | (2020.01) | |
| G06F 40/174 | (2020.01) | |
| G06F 40/18 | (2020.01) | |
| G06N 3/02 | (2006.01) | |
| G06N 5/025 | (2023.01) | |
| G06N 20/00 | (2019.01) | |
| G06Q 10/10 | (2023.01) | |
| G06Q 20/38 | (2012.01) | |
| G06Q 20/40 | (2012.01) | |
| G06Q 30/018 | (2023.01) | |
| G06Q 30/0201 | (2023.01) | |
| G06Q 30/0601 | (2023.01) | |
| G06Q 40/02 | (2023.01) | |
| G06Q 40/03 | (2023.01) | |
| H04L 9/08 | (2006.01) | |
| H04L 9/40 | (2022.01) | |
| H04L 29/06 | (2006.01) | |
| H04L 67/01 | (2022.01) | |
| G06F 8/65 | (2018.01) | |
| G06F 8/71 | (2018.01) | |
| G06K 7/14 | (2006.01) | |
| G06Q 50/26 | (2012.01) | |

(52) U.S. Cl.
CPC ............ *G06F 9/547* (2013.01); *G06F 16/258* (2019.01); *G06F 16/9558* (2019.01); *G06F 16/9562* (2019.01); *G06F 18/24* (2023.01); *G06F 21/53* (2013.01); *G06F 21/602* (2013.01); *G06F 21/604* (2013.01); *G06F 21/6227* (2013.01); *G06F 21/6245* (2013.01); *G06F 40/103* (2020.01); *G06F 40/174* (2020.01); *G06F 40/18* (2020.01); *G06N 3/02* (2013.01); *G06N 5/025* (2013.01); *G06N 20/00* (2019.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *G06Q 40/03* (2023.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *H04L 67/01* (2022.05); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(56) References Cited

U.S. PATENT DOCUMENTS

| | | |
|---|---|---|
| 7,107,241 B1 | 9/2006 | Pinto |
| 7,860,767 B1 | 12/2010 | Vinci et al. |
| 8,099,605 B1 | 1/2012 | Billsröm et al. |
| 8,666,885 B1 | 3/2014 | Bramlage et al. |
| 8,924,720 B2 | 12/2014 | Raghuram et al. |
| 9,137,228 B1 | 9/2015 | Newstadt |
| 9,646,172 B1 | 5/2017 | Hahn et al. |
| 9,762,616 B2 | 9/2017 | Nagaratnam et al. |
| 9,965,911 B2 | 5/2018 | Wishne |
| 10,033,702 B2 | 7/2018 | Ford et al. |
| 10,171,457 B2 | 1/2019 | Moore et al. |
| 10,243,945 B1 | 3/2019 | Kruse et al. |
| 2002/0023051 A1 | 2/2002 | Kunzle et al. |
| 2002/0033838 A1 | 3/2002 | Krueger et al. |
| 2002/0040339 A1 | 4/2002 | Dhar et al. |
| 2002/0067907 A1 | 6/2002 | Ameres |
| 2002/0091629 A1 | 7/2002 | Danpour |
| 2003/0036993 A1 | 2/2003 | Parthasarathy |
| 2005/0086176 A1 | 4/2005 | Dahlgren et al. |
| 2005/0203834 A1 | 9/2005 | Prieston |
| 2006/0178983 A1 | 8/2006 | Nice et al. |
| 2007/0061248 A1 | 3/2007 | Shavit et al. |
| 2007/0250718 A1 | 10/2007 | Lee et al. |
| 2008/0092240 A1 | 4/2008 | Sitrick et al. |
| 2009/0327196 A1 | 12/2009 | Studer et al. |
| 2012/0017085 A1 | 1/2012 | Carter et al. |
| 2012/0246061 A1 | 9/2012 | Ericksen |
| 2012/0254957 A1 | 10/2012 | Fork et al. |
| 2013/0191629 A1 | 7/2013 | Treinen et al. |
| 2014/0006048 A1 | 1/2014 | Liberty |
| 2014/0189123 A1 | 7/2014 | Dodd et al. |
| 2014/0207571 A1 | 7/2014 | Hammock et al. |
| 2014/0237236 A1 | 8/2014 | Kalinichenko et al. |
| 2014/0304170 A1 | 10/2014 | Spotanski et al. |
| 2015/0026038 A1 | 1/2015 | Alsbrooks |
| 2015/0074407 A1 | 3/2015 | Palmeri et al. |
| 2015/0161364 A1 | 6/2015 | Makarov et al. |
| 2015/0347770 A1 | 12/2015 | Whalley et al. |
| 2015/0356314 A1* | 12/2015 | Kumar ............... G06F 21/6245 |
| | | 713/165 |
| 2017/0091231 A1 | 3/2017 | DiFranco et al. |
| 2017/0244695 A1 | 8/2017 | Lund et al. |
| 2018/0053253 A1 | 2/2018 | Gokhale et al. |
| 2018/0083931 A1 | 3/2018 | Baig et al. |
| 2018/0108105 A1 | 4/2018 | Duesterwald et al. |
| 2018/0158139 A1 | 6/2018 | Krajicek et al. |
| 2018/0218121 A1 | 8/2018 | Gassner et al. |
| 2018/0218159 A1 | 8/2018 | Smith, III et al. |
| 2018/0260576 A1 | 9/2018 | Miguel |
| 2018/0332016 A1 | 11/2018 | Pandey et al. |
| 2019/0238321 A1 | 8/2019 | Park et al. |
| 2020/0153814 A1 | 5/2020 | Smolny et al. |
| 2020/0372169 A1 | 11/2020 | Sundaram |
| 2021/0004479 A1* | 1/2021 | Ithal ..................... H04L 9/0897 |
| 2023/0267415 A1 | 8/2023 | Sundaram |

OTHER PUBLICATIONS

Bluttman, Ken, Using the Excel IF Function: Testing on One Condition, published Mar. 22, 2019 (available at https://www.dummies.com/article/technology/software/microsoft-products/excel/using-the-excel-if-function-testing-on-one-condition-259894/) (Year: 2019).

Cheusheva, "Excel IF function: nested IF formulas with multiple conditions, IFERROR, IFNA and more," Apr. 27, 2017 (available at https://web.archive.org/web/20170420035147/https://www.ablebits.com/office-addi ns-blog/2014/12/03/excel-if-function-iferrror-ifna/) (Year: 2017).

Cheusheva, Using IF function in Excel: formula examples for Nos., text, dates, blank cells, Apr. 27, 2017 (available at https://web.archive.org/web/20170420035257/https://www.ablebits.com/office-addins-blog/2014/11/26/if-function-excel/) (Year: 2017).

(56) References Cited

OTHER PUBLICATIONS

N. Naik and P. Jenkins, "Securing digital identities in the cloud by selecting an apposite Federated Identity Management from SAML, OAuth and OpenID Connect," 2017 11th International Conference on Research Challenges in Information Science (RCIS), Brighton, UK, 2017, pp. 163-174. (Year: 2017).

OASIS. "Security Assertion Markup Language (SAML) V2.0 Technical Overview", Sep. 2005. (Year: 2005).

\* cited by examiner

SEARCHABLE INDEX ENCRYPTION

CROSS-REFERENCE TO RELATED APPLICATIONS AND INCORPORATION BY REFERENCE

This application is a continuation of U.S. application Ser. No. 18/141,637, filed May 1, 2023, entitled "Searchable Index Encryption", which is a continuation of U.S. application Ser. No. 16/881,938, filed May 22, 22, 2020, entitled "Searchable Index Encryption", which claims the benefit of U.S. Provisional Application No. 62/852,202, filed May 23, 2019, entitled "Multi-Lender Platform" which is incorporated herein by reference in their entirety.

BACKGROUND

Encrypting data can provide security by preventing exposure of sensitive information. However, this security comes at the sacrifice of data manipulation. Data encrypted by traditional means cannot be manipulated or searched. Encrypted data is typically decrypted before searching or manipulation is performed and re-encrypted after data manipulations or queries are executed.

BRIEF SUMMARY

A method of securing user data in a multi-user environment comprises generating, using one or more processors, auditing data comprising one or more data objects. Each data object may comprise one or more pairs of a name and a value. The method may include creating partially encrypted auditing data by encrypting a first value of a first pair in the auditing data using an encryption key, while leaving a first name of the first pair unencrypted and leaving a second name and second value of a second pair in the auditing data unencrypted. The method may include replacing the first value of the first pair with the corresponding encrypted first value.

The method may further comprise storing the partially encrypted auditing data in a database or data lake.

The encrypting of the first value of the first pair may comprise encrypting the first value of the first pair using an asymmetric encryption key.

The method may further comprise receiving, from an end user, a public key as the asymmetric encryption key.

The method may further comprise receiving a data query and identifying one or more objects in the auditing data where the name of the second pair and the second value of the second pair match the data query. The method may return the first pair and the second pair.

The auditing data may be generated based on applying user-defined rules to input data and represented in human readable text.

The name may be represented by a string, and the value may be represented by a data type comprising a number, a string, a boolean, an array, or a data object.

In some embodiments, systems of the disclosed embodiments may include a computer-readable device storing computer instructions for any of the methods disclosed herein and computer program products of the disclosed embodiments may include one or more processors configured to read instructions from a computer readable device to perform any of the methods disclosed herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

The embodiments described herein relate to performing encryption on data in a way that allows a search to be performed on the encrypted data. In particular, data is stored in a data structure comprising one or more pairs of a name and a value. Each of the name and value may be initially generated in plain text. According to an embodiment, the name represents an index value, which is not encrypted. The value of a pair may be encrypted, leaving the name of the pair in plain text. According to an embodiment, some name-value pairs may be identified or flagged as containing sensitive data, based on the name and/or path of the pair in the data structure. According to an embodiment, the value of a flagged name-value pair may be encrypted while the name and value pair of non-flagged name-value pair may be stored in plain text.

Figure 1:
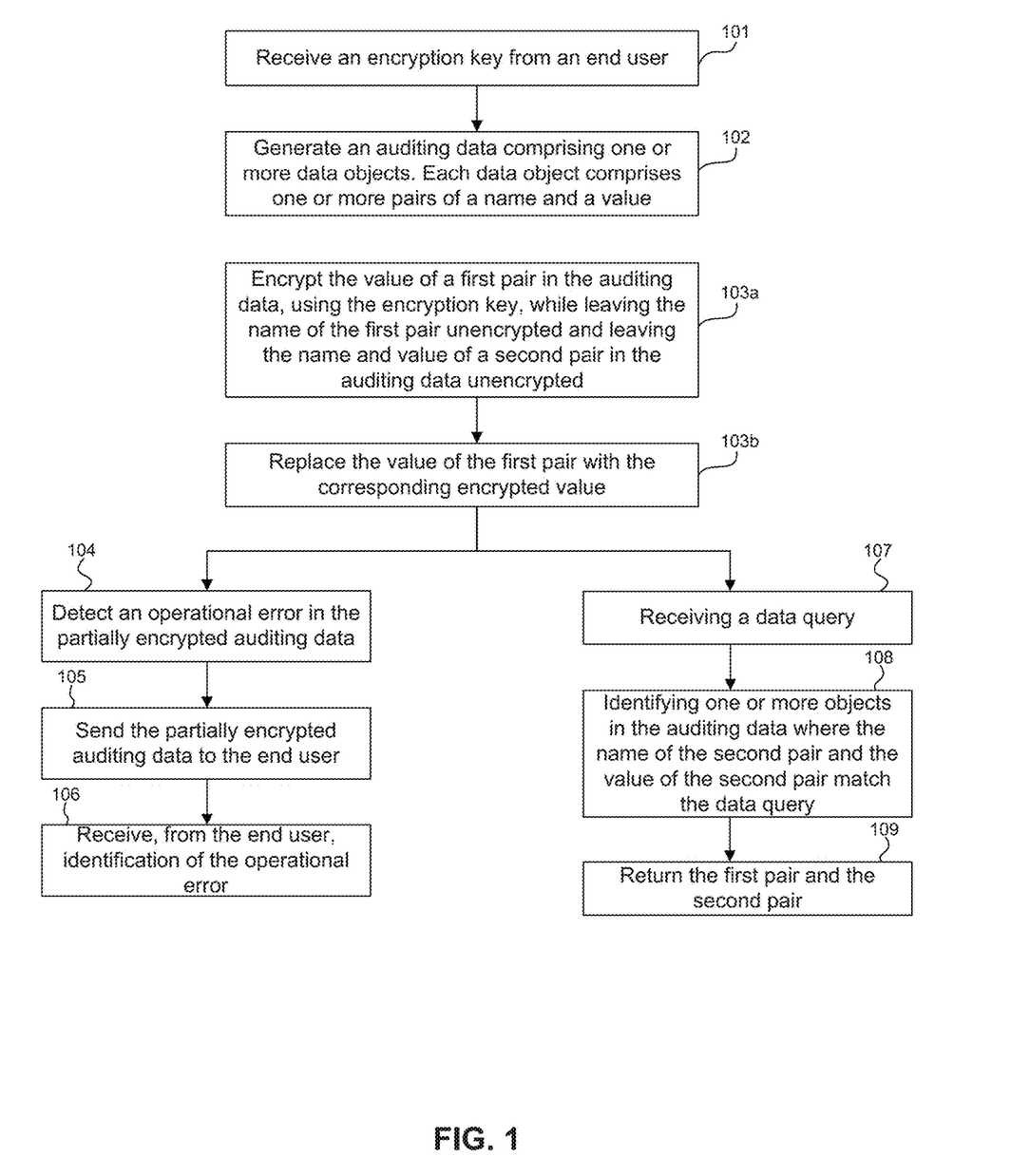
FIG. 1 is a flow chart illustrating steps of a method for performing encryption according to embodiments disclosed herein.

FIG. 1 is a flow chart illustrating steps of a method for performing encryption according to embodiments disclosed herein. The encryption method may be performed by any computer system, non-limiting examples of which are disclosed herein.

At step 101, the system may receive an encryption key from a user. The user may generate the encryption key according to any method known in the art. According to an embodiment, the encryption key is an asymmetric encryption key which can be used to encrypt data, but cannot be used to decrypt the encrypted data. The asymmetric encryption key may be a public key of a Public Key Infrastructure (PKI) key pair.

At step 102, the system may generate auditing data. The auditing data may comprise one or more data objects. Each data object may comprise one or more pairs of a name and a value. The name may be equivalent to an index and may be expressed as a string. The value may comprise a number, a string, a boolean, an array, a data object, or a null value. According to an embodiment, the auditing data conforms to the JavaScript Object Notation (JSON) standard. The auditing data may be generated by running an application or process associated with the user. The application or process may be run based on the provision of functions as a service (FaaS) or another remote, distributed, or cloud computing service. Any computer application or process may be configured to generate auditing data according to the embodiments disclosed herein. Auditing data may comprise a combination of sensitive and non-sensitive data. Sensitive data may be any data that the user desires to protect from exposure to third parties or the system administrator.

At step 103a, the system may encrypt the value of a first pair in the auditing data. The first pair may comprise sensitive data. The first pair may be flagged as sensitive data by the user or by an administrator of the system. According to some embodiments, the flagging may be done using a tag preceding the first pair. For example, a tag such as "@encrypt" might be used to indicate that the pair following the @encrypt tag contains sensitive data to be encrypted. Different tag formats may be used depending on the format used to record the auditing data. According to one embodiment, the auditing data are recorded using the JavaScript Object Notation JSON standard. The encryption may be performed using the encryption key received from the user. According to an embodiment, the name of the first pair may be left unencrypted. The unencrypted name of the first pair may remain in plaintext form. The name and value of a second pair in the auditing data may be left unencrypted. According to an embodiment, the unencrypted name and value of the second pair may remain in plaintext form.

At step 103b, the value of the first pair in the auditing data may be replaced with the encrypted value of the first pair. The auditing data comprising one or more encrypted values may be referred to as partially encrypted auditing data. The partially encrypted auditing data may be stored locally or remotely in log storage. The log storage may be a computer readable device. According to an embodiment, the partially encrypted auditing data is stored at a secure location allowing the user to access the auditing data over a network. The auditing data may also be accessible to an administrator of the system or to third-parties.

The auditing data may comprise data useful for troubleshooting execution of the application or process that created the auditing data. At step 104, the system detects an operational error in the partially encrypted auditing data. The system administrator may access, view, and analyze unencrypted names and/or values in the partially encrypted auditing data in order to detect operational errors in the application or process that generated the auditing data. According to an embodiment, the system administrator may access, view, and analyze the partially encrypted auditing data while maintaining the privacy and security of the user. The system administrator may perform searches and/or computations on the name associated with an encrypted value of a pair and may perform searches and/or computations on both the name and value of unencrypted pairs.

At step 105, the system may send one or more data objects of the partially encrypted auditing data to the user. The system administrator may identify an operational error based on the partially encrypted auditing data, but the specific operational error may not be identifiable because one or more values required to identify the operational error are encrypted. The system may send the relevant partially encrypted data objects of the auditing data to the user for decryption and identification of the specific operational error.

At step 106, the system receives an identification of the operational error from the user. The user that provided the asymmetric encryption key to the system may have access to the corresponding asymmetric decryption key. The user may use this asymmetric decryption key to decrypt any encrypted values in the auditing data. The user may use the information received from the system and the decrypted values to identify the specific operational error detected by the system.

At step 107, the system may receive a query. The query may be sent by the user. The user may access the log storage and query the partially encrypted auditing data to retrieve both encrypted and unencrypted data. The query may also be sent by a third party with access to the log storage. If the third party retrieves partially encrypted auditing data from the log storage, the values containing sensitive data are encrypted and the privacy and security of the user are protected.

At step 108, the system identifies one or more data objects in the auditing data. The data objects may be identified based on the unencrypted name of the second pair and the unencrypted value of the second pair matching the data query. The data objects may be identified based on the unencrypted name of the first pair, corresponding to the encrypted value, matching the data query.

At step 109, the system may return the partially encrypted first pair and the unencrypted second pair to the user. The partially encrypted first pair and the unencrypted second pair may be returned to the user based on the unencrypted name of the first pair and the unencrypted name of the second pair both matching a name identified in the data query.

According to an embodiment, the data objects in the auditing data may comprise a number, a string, a boolean, an array, a data object, or a null value. Therefore, a data object of the auditing data may be nested within another data object. A data object may comprise multiple name-value pairs. In step 109, the first pair and the second pair may be returned to the user based on a relationship between a data object containing the first pair and a data object containing the second pair. The first pair and the second pair may both be contained within the same data object. The first pair and the second pair may be contained in sibling data objects (both objects contained in the same parent object). The first pair and the second pair may have a common grandparent object and/or a great-grandparent object. The first pair and the second pair may share all or part of the paths identifying their locations in the auditing data. The data query may identify the relationship used to determine which partially encrypted pairs should be returned in addition to an unencrypted pair with a name and value matching the data query.

By leaving names unencrypted and encrypting values flagged as containing sensitive data, while storing other values in plain text, the system creates auditing data with searchable indices. Analysis can be performed and metrics can be generated based on the unencrypted names and/or values of the auditing data. Searches may also be performed and data queries evaluated based on the unencrypted names and/or values of the auditing data. Pairs with encrypted values may be returned based on a partial match with a data query and/or based on a relationship to pairs that match the data query.

One non-limiting example use case for the embodiments disclosed herein is in a multi-lender architecture configured to provide loan applicants with automated pre-qualification and automobile loan eligibility evaluation for multiple candidate lenders. In this non-limiting example, the user may be a loan applicant. Aspects of this non-limiting example are described with reference to FIGS. 2-5. The multi-lender architecture may apply lender-provided rule sets to applicant data in order to determine if the applicant qualifies for a loan with the lender. Auditing data may be generated during the process of applying the lender's rule sets to applicant data. In order to prevent reverse-engineering of the lender's proprietary rule sets, certain parts of the auditing data may be encrypted. The multi-lender architecture may be able to perform analysis of the auditing data without exposing the lender's sensitive data, and the lender may be able to perform data queries on the auditing data in order to verify that the lender's rule sets are being correctly evaluated against applicant data.

Figure 2:
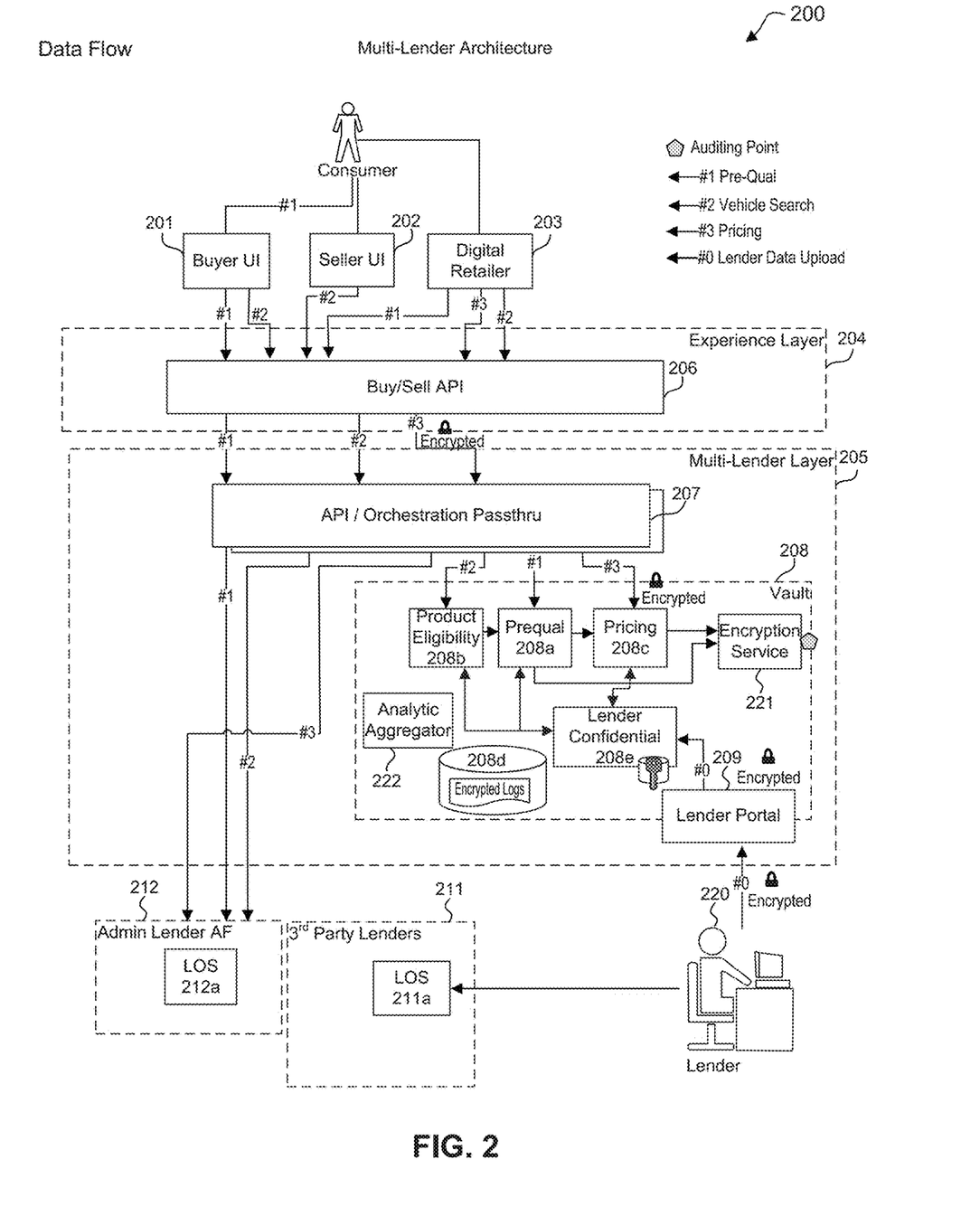
FIG. 2 is a block diagram of a multi-lender architecture according to an embodiment.

Rule sets may include user-defined rules such as pre-qualification rules, loan eligibility rules, lending rules, filing policies, lending policies, product eligibility policies, or any criteria or sensitive lender data applied to applicant data in processing lending decisions within the vault 208. The vault 208 may process the pre-qualification, vehicle eligibility, and pricing information associated with building a loan offer for multiple lenders, in parallel, using the rule sets provided by each lender.

FIG. 2 is a block diagram of a multi-lender architecture according to an embodiment.

As illustrated in FIG. 2, the multi-lender architecture 200 may include an experience layer 204 and a multi-lender layer 205. In some embodiments, the experience layer 204 may be accessed via numerous user interfaces (UIs), which may be executed on a client device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. For example, the UIs may include buyer UI 201, seller UI 202, and/or digital retailer UI 203. In some embodiments, a customer may use a personal client device to log in using the buyer UI 201 or the digital retailer UI 203. Similarly, a dealer or digital retailer may use a client device to log in using the seller UI 202. After logging in, the customer or the dealer may interact with the multi-lender architecture 200 via the experience layer 204, through a Buy/Sell application programming interface (API) 206. For example, the experience layer 204 may display information to the customer, dealer, or digital retailer in a lender agnostic format. That is, information may be displayed to the customer, dealer, or digital retailer on the client device in a universal, applicant-friendly format using the experience layer 204. For example, the information may include application forms, pre-qualification results from lenders, pricing on eligible vehicles for purchase, or the like. In some embodiments, the experience layer 204 may communicate with the multi-lender layer 205. For example, an API Passthru 207 of the multi-lender layer 205 may communicate with the Buy/Sell API 206 of the experience layer 204.

In some embodiments, the multi-lender architecture 200 may be associated with a financial institution (e.g., bank or lender), which may provide its own lending platform 212. The lending platform 212 may include a loan origination system 212a. In some embodiments, the UIs 201-203 may communicate back and forth with the loan origination system 212a to generate a loan offer from the financial institution via the Buy/Sell API 206 and the API Passthru 207. In some embodiments, the lending platform 212 may receive rule sets, from the financial institution, for prequalifying an applicant, determining product eligibility, and determining pricing for the product. In some embodiments, one or more third-party lenders may upload (e.g. through lender portal 109) to the multi-lender architecture 100, rule sets for pre-qualification, vehicle eligibility, and/or pricing, to enable generation of a respective loan offer for each of the third-party lenders. The third-party rule sets may be stored and processed within vault 108. In some embodiments, the UIs 201-203 may communicate in parallel with the vault 208 and with the loan origination system 212a to generate a loan offer from the financial institution, as discussed below. The loan offers from the lending platform 212 may be presented alongside the loan offers from third-party lenders 211 on the UIs 201-203.

In some embodiments, the multi-lender architecture 200 may include a third-party API 211 including a third-party loan origination system 211a. In the case a lender does not upload to the multi-lender architecture 200, pre-qualification rules, vehicle eligibility, and pricing, the third-party loan origination system 211a may generate a loan offer for the lender. The third-party loan origination system 211a may communicate with the UIs 201-203 via the Buy/Sell API 206 and the API Passthru 207 to generate a loan offer, in parallel, with the micro-processes (e.g., pre-qualification micro-service 208a, product eligibility micro-service 208b, and pricing micro-service 208c). The loan offers from the third-party API may be presented alongside the loan offers from the other lenders on the UIs 201-203.

As shown in FIG. 2, the multi-lender layer 205 may include the vault 208, which may include a pre-qualification micro-service 208a, a product eligibility micro-service 208b, a pricing micro-service 208c, a log storage (e.g., a data repository) 208d for storing encrypted logs, and a lender confidential repository 208e. It should be understood, by those of ordinary skill in the art, that these micro-services and repositories are merely examples, and that the multi-lender architecture 200 may include other micro-services and repositories in accordance with aspects of the present disclosure. In some embodiments, the vault 208 may be accessed by a plurality of lenders 220 (only one shown in FIG. 2) using a lender portal 209 to provide one or more proprietary rule sets for prequalifying an applicant, determining vehicle eligibility for financing, and determining pricing information for each eligible vehicle.

Sensitive lender data may be encrypted when sent to or from the lender portal 209 using an encryption service 221. The encryption service 221 may be implemented using various encryption protocols. Encryption keys are unique to each lender 220 using the lender portal 209 and the unique encryption keys corresponding to each lender 220 may be used to encrypt and decrypt the sensitive data corresponding to each lender 220 using the lender portal 209.

The multi-lender architecture 200 may also include an analytic aggregator 222. The analytic aggregator may be embodied as a micro-service residing in the vault 208. The analytic aggregator 222 may capture data generated in the vault 208 for each applicant (e.g., pre-qualification results, product eligibility results, and offers) for each lender and store the captured auditing data in the log storage 208d. The auditing data may be encrypted using encryption keys specific to a given lender, such that only the lender may decrypt data from the encrypted logs. A lender may download auditing data, specific to the lender itself, from the log storage 208d.

The pre-qualification micro-service 208a may generate pre-qualification results, in response to processing the applicant's pre-qualification request for each of the multiple lenders. The pre-qualification results may include a subset of lenders, from the set of lenders, which have pre-qualified the applicant for an automobile loan based on the personal information of the applicant and the pre-qualification rules associated with the respective lender. The pre-qualification results can include a decision on whether the lender has pre-qualified an applicant for an automobile loan. In an embodiment, the pre-qualification results may also include information associated with a loan offer such as a range of possible Annual Percentage Rates (APRs) and terms and conditions of the loans. In an embodiment, the vault 208 may transmit the pre-qualification results to the Buyer UI 201 unencrypted. Alternatively, the vault 208 may encrypt the pre-qualification results using the encryption service 221 and transmit the encrypted pre-qualification results to the Buyer UI 201, via the API Passthru 207. In the event the pre-qualification results are encrypted, the Buyer UI 201 can decrypt the encrypted pre-qualification results. The Buy/Sell API 206, may render the pre-qualification results on the Buyer UI 201 GUI.

The Buy/Sell API 106 may generate a call to a product eligibility micro-service 208b for each lender for which the applicant is prequalified for an automobile loan (i.e., each lender included in the pre-qualification results). The API Passthru 207 may communicate, to the vault 208, each call to the product eligibility micro-service 208b and the information associated with the selected vehicle. The vault 208 may execute the product eligibility micro-service 208b, based on the information associated with the selected vehicle. The product eligibility micro-service 208b may retrieve product eligibility policies (or product eligibility information), associated with the lenders included in the subset of lenders, from the lender confidential repository 208e. The product eligibility micro-service 208b may determine, in parallel, whether the selected vehicle is eligible for an automobile loan from each lender for which the applicant is prequalified for an automobile loan, based on the information associated with the selected vehicle and product eligibility policies for each of the respective lenders. The product eligibility policies may be different for each lender. For example, each lender may have different requirements for make, model, year, mileage, price, and/or the like. In this regard, the product eligibility micro-service 208b may determine certain vehicles are not eligible for automobile loans from given lenders.

The product eligibility micro-service 208b may generate product eligibility results. The product eligibility results may include one or more lenders, from the subset of lenders, for which the product eligibility micro-service 208b determined the selected vehicle is eligible for an automobile loan. The API Passthru 207 may forward the product eligibility results to the Buy/Sell API 206. The Buy/Sell API 206, may render the decrypted product eligibility results on the Buyer UI 201 GUI.

The pricing micro-service 208c may generate the pricing offers for automobile loans from various lenders. The pricing offers may include loan amounts, APRs, and terms and conditions of the automobile loan. The vault 208 may encrypt the offers using the encryption service 221 and transmit the encrypted pricing offers to the Buyer UI 201, via the API Passthru 207. In an example, the Buy/Sell API 206 may decrypt the encrypted offers and interface with the Buyer UI 201 to render the decrypted offers on the Buyer UI 201 GUI. Buyer UI 201 can decrypt the encrypted offers and render the decrypted offers on the Buyer UI 201 GUI.

Additionally, as the vault 208 processes the rule sets for multiple lenders 220, the loan origination system 212a and/or third-party loan origination system 211a may simultaneously process the loan application. In this way, the multi-lender architecture 200 may assess applicant eligibility and vehicle eligibility, as well as pricing for eligible vehicles (e.g., personalized interest rates and monthly payments), for any number of lenders in parallel. The vault 208 may reside in a jailed, self-contained network, configured to receive and transmit data in an encrypted format. In some embodiments, the vault 208 may be a multi-tenant arrangement within a larger multi-tenant arrangement. The multi-tenant arrangement is a self-contained network where lenders may manage their own separate accounts. Each lender may be able to securely manage its rule sets (loan eligibility rules, lending rules, filing policies, and/or the like). Lenders may view their own data inside the vault 208 and may not view data associated with other lenders. Furthermore, data inside the vault 208 may not be visible to consumers through the UIs 201-203, or any other interface.

According to an embodiment, the lender portal 209 may be configured to receive sensitive lender data, such as a new configuration or new lending policies, and a start time identifying a date and/or a time at which the new configuration or new lending policies should go into effect. The vault 208 may be configured to switch to the new configuration or new lending policies at the date and/or time identified by the start time.

In some embodiments, the multi-lender architecture 200 may include a plurality of interactive micro-services that communicate with one another in a bi-directional manner to create a normalized process for purchasing and financing a product, such as a vehicle. The normalized process may include prequalifying one or more applicants for a loan with a plurality of lenders to purchase the product and calculating pricing details for each loan that would be offered by each lender based on an applicant's credentials. In some aspects, the pricing may be for a specific vehicle selected by the applicant or across a range of vehicles available in an inventory. Availability of a vehicle for each lender may vary based on relationships between each lender and associated dealerships or lender specific policies based on credit score, vehicle, geography, etc. That is, the multi-lender architecture 200 provides for an end-to-end architecture that tailors applicant-specific credentials to be analyzed against lender specific requirements and performs the analysis to guide the customer and lenders through the steps of prequalifying the customer, determining vehicle eligibility, determining vehicle pricing, and providing a credit application from the applicant to a selected lender.

Each of data processes (#1 Pre-qualification, #2 Vehicle Search, #3 Pricing, and #0 Lender Data upload) may generate logging and/or auditing data. Data passing into and out of the vault may also generate logging and/or auditing data. Data passing into and out of the vault may be encrypted for storage in the vault and decrypted for retrieval from the vault. Data decrypted upon retrieval from the vault may be re-encrypted, using different encryption keys, for transmission to lenders. An audit point is also illustrated in FIG. 2. The encryption service 221 may generate audit data that may be used to verify that appropriate measures are being taken to secure sensitive lender data to satisfy internal privacy policies and legal anti-trust requirements. The pre-qualification micro-service 208a, product eligibility micro-service 208b, and the pricing micro-service 208c may also generate logging and/or auditing data.

Figure 3:
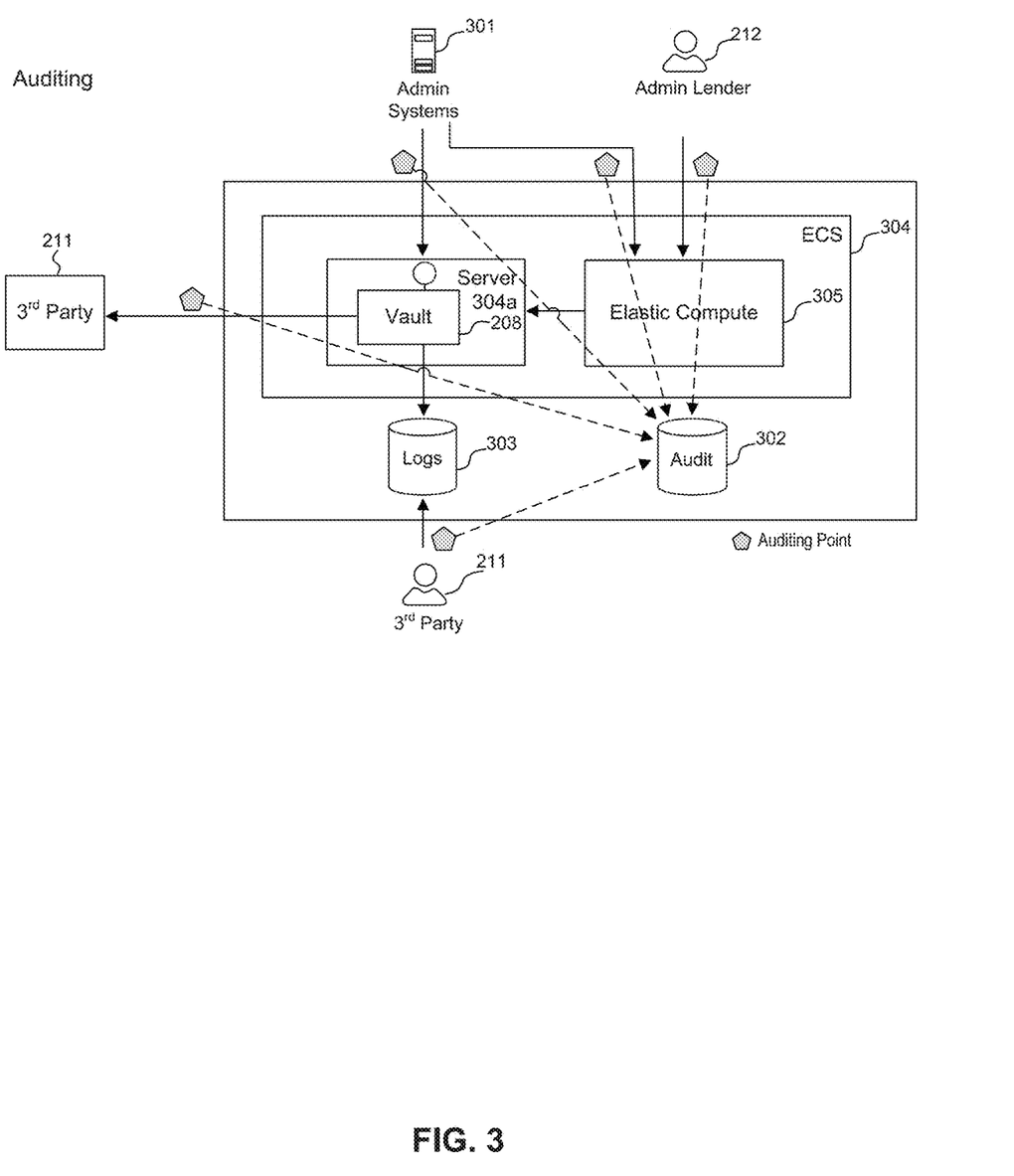
FIG. 3 is a block diagram illustrating a security aspect of the multi-lender architecture according to an embodiment.

FIG. 3 is a block diagram illustrating a security aspect of the multi-lender architecture according to an embodiment.

As shown in FIG. 3, the vault 208 may be a data structure stored on a non-transitory computer-readable medium which may be present on a server 304a, as part of an elastic, or scalable, compute service 305 which may comprise a plurality of servers. An elastic compute service may be a cloud-based computing service providing scalable deployment of applications using virtual machines that may be configured to run any desired software. The elastic compute service may be implemented using an elastic container service (ECS) 304. An elastic container service 304 may be a tool that manages deployment of applications on the elastic compute service 305. In this manner, the vault 208 may be constructed such that not even a person associated with the administrator of the multi-lender architecture 200, such as admin lender 212, may be able to access the vault 208. Only a third-party lender 220 that has their sensitive lender data stored on the lender confidential repository 208e may access the vault 208, in an indirect manner, through the lender portal 209. In particular, through segregating sensitive lender data by maintaining separate accounts for different third-party lenders on the portal, no external system may access sensitive lender data of a specific third-party lender 211 in the vault 208.

The multi-lender architecture 200 may include audit capabilities associated with access points or traffic pathways to and from the elastic container service (ECS) 304. According to an embodiment, audit data may be collected from each point of access to the vault 208. Whenever third-parties 211 access logs 303 or processing results such as lending decisions or data related to lending offers from the vault 208, audit data may be generated and stored in an audit data repository 302. Access points for admin systems 301 to the vault 208 or elastic compute service 305 are also audited. An admin lender's 212 access to the elastic container service ECS 304 may also be included in the audit data repository 302. The audit data repository 302 may store data comprising details of the lender-specific rule sets that were executed and data sent through the experience layer 204 or the multi-lender layer 205 to demonstrate to an independent auditor that the data is not being changed or altered in any way as it traverses through the different components of layers of the multi-lender architecture 200.

Figure 4:
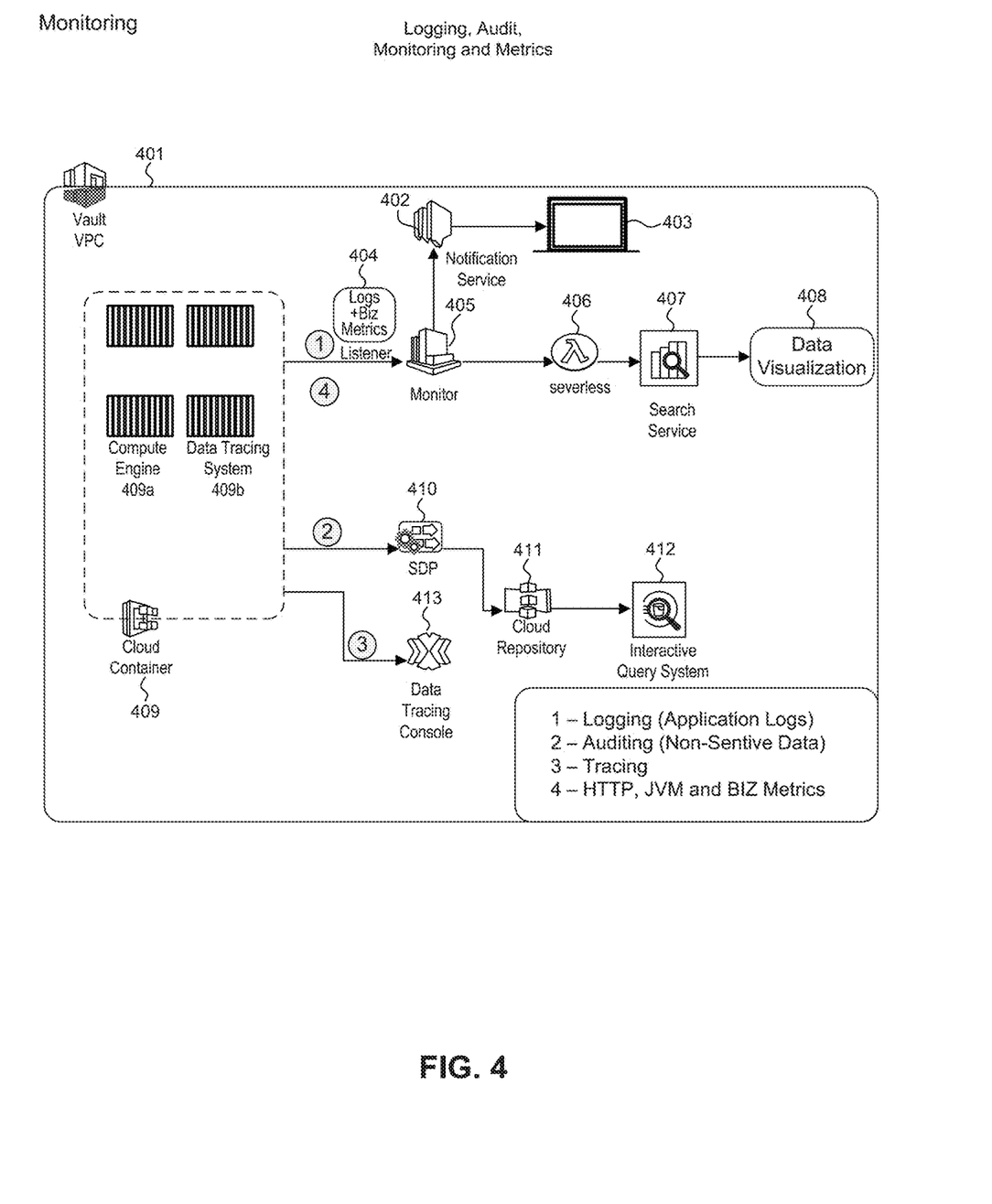
FIG. 4 is a block diagram illustrating processes for logging, auditing, monitoring and generating metrics according to an embodiment.

Referring to FIG. 4, the one or more modules or layers of the multi-lender platform, for example, the vault 208, may be hosted in a virtual private cloud (VPC) 401. The VPC 401 may host various services, such as a cloud container 409 comprising various services such as a compute engine 409a and data tracing system 409b. Logs and business metrics 404 from the cloud container 409 are monitored by a monitor service 405. A serverless computing service 406 translates data from the monitor service 405 into a format usable by a search service 407, allowing both monitor service 405 and search service 407 to be used on the listener output from the services running in the cloud container 409. A data visualization application 408 uses the search service 407 to present data in graphs, charts, animations, and other visualizations. Data from the monitor service 405 is also sent to the notification service 402, which may be configured to generate notifications suitable for a real-time operations management or incident management system 403.

The streaming data platform (SDP) 410 extends capabilities of the data tracing system 409b, allowing the cloud repository 411 to provide additional functionality to the interactive query system 412. A data tracing console may be configured to monitor application performance of the compute engine 409a and data tracing system 409b operating in the cloud container 409. Each of streams 1 logging, 2 auditing, 3 tracing, and 4 business metrics may provide visibility into different operational aspects of the system and contribute different data to the auditing data.

Figure 5:
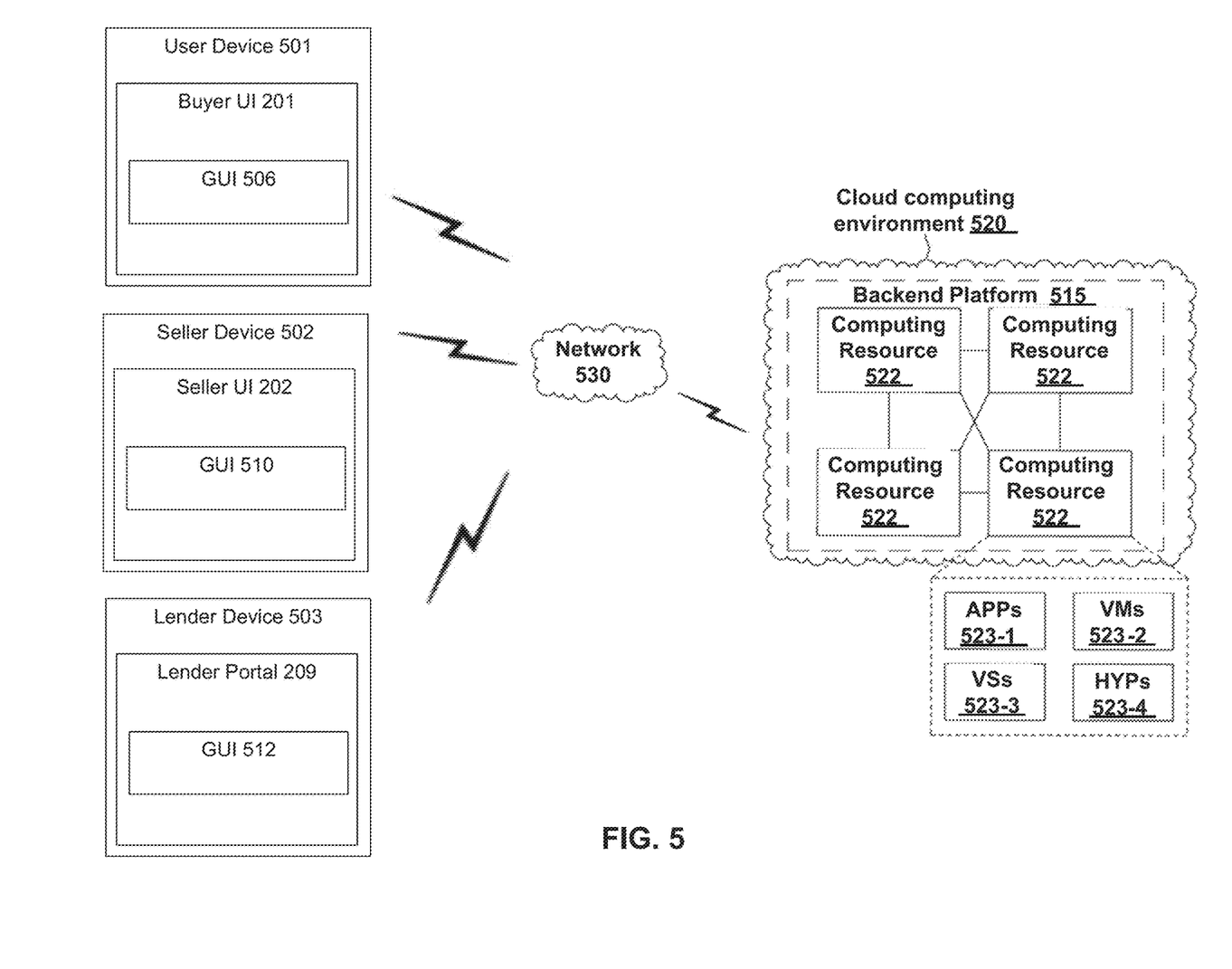
FIG. 5 is a block diagram of a non-limiting example network environment suitable for some disclosed embodiments.

FIG. 5 is a block diagram of an example network environment suitable for some disclosed embodiments.

The environment 500 may include a user device 501, a dealer device 502, and a lender device 503, a backend platform 515, a cloud computing environment 520, and a network 530. The devices of the environment 500 may be connected through wired connections, wireless connections, or a combination of wired and wireless connections.

In an example embodiment, one or more portions of the network 530 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi-Fi network, a WiMAX network, any other type of network, or a combination of two or more such networks.

The backend platform 515 may include one or more devices configured to host the multi-lender architecture 200. The backend platform 515 may include a server or a group of servers. In an embodiment, the backend platform 515 may be hosted in a cloud computing environment 520. It may be appreciated that the backend platform 515 may not be cloud-based, or may be partially cloud-based.

The user device 501, dealer device 502, and lender device 503 may include one or more devices configured to interface with the backend platform 515. The user device 501 may include a Buyer UI 501; the dealer device 502 may include a Seller UI 502 application; and the lender device 503 may include a lender portal 509. The Buyer UI 501 and the Seller UI 502 application, as described with respect to FIG. 5, may be used by users to receive loan offers for vehicles that are intended to be purchased. The lender portal 509 may be used to access the multi-lender layer (e.g., multi-lender layer 505 as shown in FIG. 5) so that lenders may upload rule sets associated with pre-qualification, product eligibility, and pricing, to the vault 208 (e.g., the vault 208 as shown in FIG. 2). Each of the user device 501, dealer device 502, and lender device 503 may include a display respectively. The Buyer UI 501 may render a GUI 506 on the display of the user device 501. The Seller UI 502 application may render a GUI 510 on the display of the seller device 502. The lender portal 509 may render a GUI 512 on the display of the lender device 503.

In an embodiment, a digital retailer can be a web domain configured to access the backend platform 515 using a hyperlink. The user device 501, dealer device 502, or lender device 503 can access the web domain using a web browser.

In an embodiment, the Seller UI 502 application can communicate with the user device 501. As an example, the Seller UI 502 can transmit a link to the user device 501 to initiate a pre-qualification request as described with respect to FIG. 5.

The cloud computing environment 520 includes an environment that delivers computing as a service, whereby shared resources, services, etc. may be provided to the devices 501, 502, 503 and/or the backend platform 515. The cloud computing environment 520 may provide computation, software, data access, storage, and/or other services that do not require end-user knowledge of a physical location and configuration of a system and/or a device that delivers the services. the cloud computing system 520 may include computer resources 522.

Each computing resource 522 includes one or more personal computers, workstations, computers, server devices, or other types of computation and/or communication devices. The computing resource(s) 522 may host the backend platform 515. The cloud resources may include compute instances executing in the computing resources 522. The computing resources 522 may communicate with other computing resources 522 via wired connections, wireless connections, or a combination of wired or wireless connections.

Computing resources 522 may include a group of cloud resources, such as one or more applications ("APPs") 522-1, one or more virtual machines ("VMs") 522-2, virtualized storage ("VS") 522-3, and one or more hypervisors ("HYPs") 522-4.

Application 522-1 may include one or more software applications that may be provided to or accessed by the user device 501, dealer device 502 and the lender device 503. In an embodiment, applications may execute locally on the user device 501, dealer device 502 and the lender device 503. Alternatively, the application 522-1 may eliminate a need to install and execute software applications on the user device 501, dealer device 502 and the lender device 503. The application 522-1 may include software associated with backend platform 515 and/or any other software configured to be provided across the cloud computing environment 520. The application 522-1 may send/receive information from one or more other applications 522-1, via the virtual machine 222-2.

Virtual machine 522-2 may include a software implementation of a machine (e.g., a computer) that executes programs like a physical machine. Virtual machine 522-2 may be either a system virtual machine or a process virtual machine, depending upon the use and degree of correspondence to any real machine by virtual machine 522-2. A system virtual machine may provide a complete system platform that supports execution of a complete operating system (OS). A process virtual machine may execute a single program and may support a single process. The virtual machine 522-2 may execute on behalf of a user (e.g., the user device 501, dealer device 502 and the lender device 503) and/or on behalf of one or more other backend platforms 515, and may manage infrastructure of the cloud computing environment 520, such as data management, synchronization, or long duration data transfers.

Virtualized storage 522-3 may include one or more storage systems and/or one or more devices that use virtualization techniques within the storage systems or devices of computing resource 522. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically stored. This may enable optimization of storage use, server consolidation, and/or performance of non-disruptive file migrations.

Hypervisor 522-4 may provide hardware virtualization techniques that allow multiple operations systems (e.g., "guest operating systems") to execute concurrently on a host computer, such as computing resource 522. Hypervisor 522-4 may present a virtual operating platform to the guest operating systems, and may manage the execution of multiple instances of a variety of operating systems and may share virtualized hardware resources.

Figure 6:
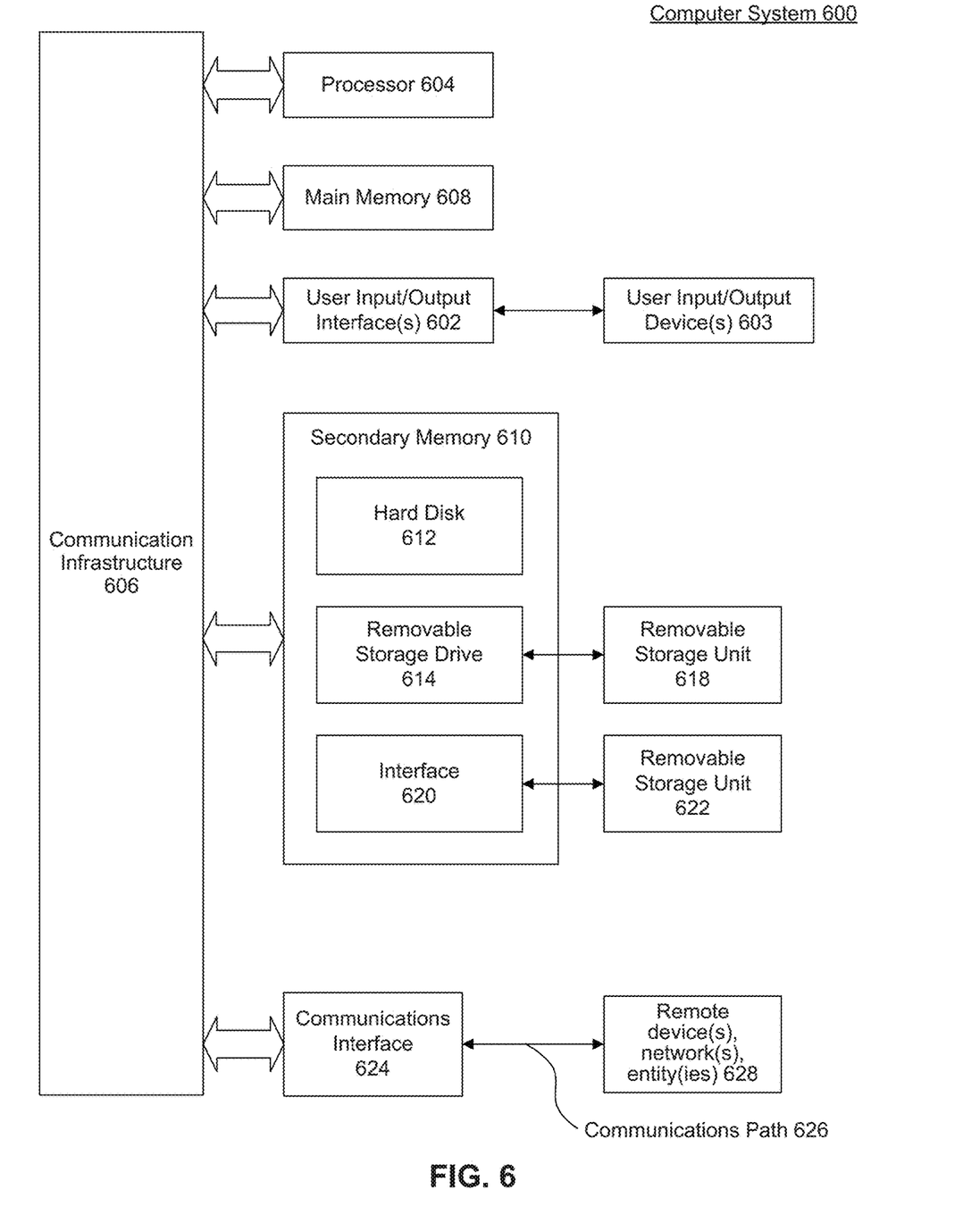
FIG. 6 is a block diagram of a non-limiting example computer system useful for implementing various embodiments disclosed herein.

FIG. 6 is a block diagram of a non-limiting example computer system useful for implementing various embodiments disclosed herein.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache and/or registers. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of securing user data in a multi-user environment, the method comprising:
    receiving partially encrypted auditing data comprising a data object that includes an identifier and a value,
        wherein the auditing data is generated data based on a user-defined rule applied to input data, and the user-defined rule comprises at least one of a rule for prequalifying a user for a transaction, a rule for determining product eligibility, or a rule for determining a price for a product;
        wherein the partially encrypted data is partially encrypted by:
    encrypting the identifier of the data object using an encryption key, while leaving the value of the data object unencrypted;
    receiving an indication of an operational error detected in the partially encrypted auditing data; and
    outputting, based on the indication of the detected operational error, at least one of an identification of the detected operational error or confirmation of the detected operational error.

2. The method of claim 1, wherein the receiving at least one of the indication of the operational error or the confirmation of the operational error comprises receiving at least one of the indication of the operational error or the confirmation of the operational error from an administrator device that monitors interaction with the auditing data.

3. The method of claim 1, wherein at least one of the indication of the operational error or the confirmation of the operational error is based on decrypted values of the partially encrypted auditing data.

4. The method of claim 1, wherein the auditing data is received based on interaction with a user interface associated with a user device that generates the encryption key.

5. The method of claim 1, wherein the data object corresponds to at least a portion of sensitive user data generated by an entity associated with the encryption key.

6. A system comprising
a memory; and
at least one processor coupled to the memory and configured to perform operations comprising:
receiving partially encrypted auditing data comprising a data object that includes an identifier and a value,
wherein the auditing data is generated data based on a user-defined rule applied to input data, and the user-defined rule comprises at least one of a rule for prequalifying a user for a transaction, a rule for determining product eligibility, or a rule for determining a price for a product;
wherein the partially encrypted data is partially encrypted by:
encrypting the identifier of the data object using an encryption key, while leaving the value of the data object unencrypted;
receiving an indication of an operational error detected in the partially encrypted auditing data; and
outputting, based on the indication of the detected operational error, at least one of an identification of the detected operational error or confirmation of the detected operational error.

7. The system of claim 6, wherein the receiving at least one of the indication of the operational error or the confirmation of the operational error comprises receiving at least one of the indication of the operational error or the confirmation of the operational error from an administrator device that monitors interaction with the auditing data.

8. The system of claim 6, wherein at least one of the indication of the operational error or the confirmation of the operational error is based on decrypted values of the partially encrypted auditing data.

9. The system of claim 6, wherein the auditing data is received based on interaction with a user interface associated with a user device that generates the encryption key.

10. The system of claim 6, wherein the data object corresponds to at least a portion of sensitive user data generated by an entity associated with the encryption key.

11. A non-transitory computer-readable medium having instructions stored thereon that, when executed by at least one computing device, causes the at least one computing device to perform operations comprising:
receiving partially encrypted auditing data comprising a data object that includes an identifier and a value,
wherein the auditing data is generated data based on a user-defined rule applied to input data, and the user-defined rule comprises at least one of a rule for prequalifying a user for a transaction, a rule for determining product eligibility, or a rule for determining a price for a product;
wherein the partially encrypted data is partially encrypted by:
encrypting the identifier of the data object using an encryption key, while leaving the value of the data object unencrypted;
receiving an indication of an operational error detected in the partially encrypted auditing data; and
outputting, based on the indication of the detected operational error, at least one of an identification of the detected operational error or confirmation of the detected operational error.

12. The non-transitory computer-readable medium of claim 11, wherein the receiving at least one of the indication of the operational error or the confirmation of the operational error comprises receiving at least one of the indication of the operational error or the confirmation of the operational error from an administrator device that monitors interaction with the auditing data.

13. The non-transitory computer-readable medium of claim 11, wherein at least one of the indication of the operational error or the confirmation of the operational error is based on decrypted values of the partially encrypted auditing data.

14. The non-transitory computer-readable medium of claim 11, wherein the auditing data is received based on interaction with a user interface associated with a user device that generates the encryption key.

* * * * *